United States Patent Office 3,553,016
Patented Jan. 5, 1971

3,553,016
METHOD AND COMPOSITION FOR TREATING STAINLESS STEEL
Henry W. Foelsch, Elmhurst, Ill., assignor to Lithcote Corporation, Melrose Park, Ill., a corporation of Delaware
No Drawing. Filed June 2, 1967, Ser. No. 643,041
Int. Cl. C23g 1/02
U.S. Cl. 134—3         10 Claims

ABSTRACT OF THE DISCLOSURE

A composition for cleaning and treating stainless steel is disclosed comprising an aqueous solution of nitric acid and a thickening agent with or without a wetting agent. In one embodiment compositions containing nitric acid and a thickening agent of the group consisting of finely divided silica, seed flour and their mixtures and boric acid are disclosed. The method of cleaning comprises applying a coating of the composition to the surface of the metal, allowing the coating to remain for at least about one-half hour and removing the coating from the surface. The treated surface may be subjected to further passivation.

BACKGROUND OF THE INVENTION

This invention relates to the art of surface treatment of stainless steel of both the austenitic chromium-nickel type and the martensitic chromium type for the purpose of removing ferritic particles and oxides as well as corrosion products therefrom, particularly ferritic contamination resulting from processing and metallic corrosion by-products produced as the result of previous contact of the stainless steel with organic materials, cellulose, dilute salt solutions and food products such as sugar, juices and the like. Although the corrosion rates of stainless steel containers in contact with organic materials and food products such as beer, buttermilk, carbonated water, cider, cola syrups, corn syrup, fruit juices, lard, milk, molasses, cellulose, vegetable oils, sugar juices, and vegetable juices are usually negligibly low, whether at ambient temperatures or under boiling conditions, there are conditions under which these substances may promote the destruction of the passivity or the formation of active areas which must be passivated or restored to a passive state before the container is reused for the same or a different product. This corrosion problem is particularly acute where the container is drained of the food product and allowed to stand at ambient or elevated temperatures for a length of time before reuse. Food products containing chloride ions with some water have the property of selectively activating certain areas on the surface of stainless steels of the chromium or chromium-nickel type containing about 10% to 20% by weight of chromium either alone or alloyed with 8 to 15 weight percent of nickel. The corrosion rate of such activated areas appears to be accelerated where the stainless steel is part of the container surface, that is as a reinforcing band or seam associated with an adjoining metal surface that is not stainless steel. Three types of galvanic action may be involved. First, the reaction between the cathodic passive stainless steel and the less noble anodic metal comprising the remainder of the vessel interior. Second, the reaction between the cathodic passive area of the stainless steel and the affected areas which have their passivity destroyed or reduced by the action of the ions of the product and are thus anodic to the passivated areas. Third, the reaction between the cathodic passive area of the stainless steel and small, particulate areas of iron or mild steel contamination resulting from rolling the stainless steel sheets or from the action of steel or iron shot or grit abrasive blasting subsequent to original sheet passivation. A galvanic action may also be involved, between the activated areas, however small, and the areas which have resisted the action of the chloride ions present in the food solution involved.

The corrosion problem of this invention is not related to the pickling of ferrous metals wherein mill scale is removed by the application of aqueous solutions of sulfuric, hydrochloric, nitric or hydrofluoric acids at concentrations up to about 25% by weight because the nature of the corroded coating being removed is not the same as the coating produced from food products. Nor is this invention related to the special problem of pickling of stainless steels which responds best to mixtures of sulfuric and halogen acids or mixtures of sulfuric acid and sodium chloride, or hydrochloric acid alone. The corrosion problem with which this invention is concerned does not have any of the characteristics of pickling since the so-called pickling defects i.e. over-pickling, pitting, blistering and hydrogen embrittlement are not present.

SUMMARY

In accordance with this invention the discovery has been made that the irregular removal or destruction of the passive protective film on stainless steel of the chromium or chromium-nickel type as a result of contact with a reducing environment is readily replaced, reconstituted or passivated by the application of an aqueous solution of nitric acid and a thickening agent such as silica or seed flour with or without boric acid or other wetting agents under conditions to form an adherent coating thereon. Upon removal of this coating after a period of at least about 30 minutes by washing or steaming the stainless steel surface is restored to its original passivated smooth and bright finish.

An advantage and feature of the invention is that by using inexpensive ingredients at relatively low concentrations, consistent and effective treatment and cleaning is accomplished without the use of elevated temperatures, foaming agents or mechanical scraping. Another feature of this invention is that the composition can be applied to the stainless steel surface and allowed to remain thereon for an indefinite period of time as a protective coating until the rinsing or steaming step is applied without derogation of the end results.

It becomes therefore a primary object of this invention to provide a composition and method for cleaning and treating stainless steel which has had its passivity destroyed, dirty and corroded as the result of contact with a reducing environment.

Another object of the invention is to provide a cleaning and treating composition for stainless steel comprising aqueous nitric acid containing a thickening agent and the method of use of this composition.

A further object of this invention is to provide a thickened composition for restoring the passivity and coating stainless steel comprising seed flour, boric acid, nitric acid, a wetting agent and water.

Still a further object of this invention is to provide a thickened composition and coating for stainless steel comprising finely divided silica, nitric acid, a wetting agent and water.

An objection of this invention is to provide a method of coating and cleaning stainless steel which has corroded as the result of contact with natural sugar products containing upwards of 250 p.p.m. chloride ions.

These and other objects of this invention will become obvious or be explained as the specification proceeds.

DESCRIPTION OF THE PREFERRED EMBODIMENTS

In order to demonstrate the invention the following examples are given.

EXAMPLE I

A tank car which had been used to transport corn syrup was found on washing and inspection to have an internal stainless steel saddle band which was corroded and which was surface contaminated with iron particles from rolling and shot blasting. This band was 304L stainless. A suspension consisting of 400 parts of water (distilled), 40 parts of concentrated nitric acid (68%), 1.5 parts of boric acid and 227 parts of wheat flour was prepared by adding the nitric acid to the water and blending the wheat flour and boric acid therein by thorough agitation. The resulting suspension was blasted onto the stainless steel band through a pressure spray gun operating at about 60 p.s.i. After thorough application of the suspension to the steel surface it was allowed to remain quiescent for about one hour. A white moist coating was formed on the metal surface. At the end of this time the coating was steam blasted from the surface using steam at 60 p.s.i. and a temperature of about 230° F. A clean smooth, and bright surface resulted. This stainless steel band was 300 series stainless and the cleaned surface was passivated as well as cleaned of all contaminants by this treatment. On a wt. percent basis the composition used contained 4.07% $HNO_3$, 0.22% $H_3BO_3$, 33.98% flour and 61.73% water.

EXAMPLE II

Stainless steel surfaces corroded as the result of contact with corn syrup are treated with a suspension containing 40 cc. of 68% nitric acid, ⅙ lb. Cab-O-Sil M5 and 400 cc. of water (distilled). A moist coating of the suspension forms on the stainless steel surface after remaining undisturbed for about 2 hours. The coating is removed by steam blasting to uncover a clean, bright surface free of corrosion products. On a wt. percent basis, the composition used contained 5.41% $HNO_3$, 15.03% $SiO_2$ and 79.56% water.

EXAMPLE III

The process of Example I is repeated with a 300 series Stainless steel. The slurry composition of this invention passivates as it cleans and removes iron particles and oxidizes soil for easily removal by the steaming and rinsing steps.

EXAMPLE IV

The process of Example I is repeated with a 400 series stainless steel liner in a reaction vessel used to process corn syrup.

EXAMPLE V

The process of Example I is repeated with a stainless steel trough which is subjected to area corrosion because of the adherence thereto of nests of wood fibers (cellulose). The trough is restored to its original passivated state by the treatment.

In order to further illustrate various combinations of ingredients that can be used to prepare the cleaning and coating compositions of this invention, the following Table I is given.

TABLE I.—TREATING COMPOSITIONS

| Composition No.: | Ingredients (in pounds) | | | |
|---|---|---|---|---|
| | Thickener | Wetting agent | $HNO_3$* | $H_2O$ |
| 1 | 5 (flour) | .5 ($H_3BO_3$) | 10 | 88.8 |
| 2 | 40 (flour) | 1.0 ($H_3BO_3$) | 13 | 9.00 |
| 3 | 40 (flour) | 5.0 ($H_3BO_3$) | 15 | 496.8 |
| 4 | 5 ($SiO_2$) | | 18 | 400.0 |
| 5 | 35 ($SiO_2$) | 1.0 alkaryl sulfonate | 30 | 500.0 |
| 6 | 10 (kaolin) | 1.5 alkaryl sulfonate | 9 | 300.0 |
| 7 | 5 (cornstarch) | 4.0 ($H_3BO_3$) | 4.5 | 95.0 |
| 8 | 8 (wood flour) | 5.0 ($H_3BO_3$) | 10 | 100.0 |

*Active ingredient basis.

Table II shows the range of proportions of ingredients that can be used in the treating compositions of this invention.

TABLE II.—TREATING COMPOSITIONS

| Ingredient | Concentration (parts) | |
|---|---|---|
| | Range | Preferred |
| Thickener | 5-40 | 30-40 |
| Nitric acid | 3-10 | 4-6 |
| Wetting agent | 0, 0-5 | 0-5 |
| Water | 92-500 | 93-400 |

The thickener used in the treating compositions of this invention may be any inert and non-reactive thickening agent of organic or inorganic origin which in an amount sufficient to impart film forming and coating properties to the acid will serve to form a coating on the metal surface being treated. For this purpose such materials as asbestos, mica (potassium-aluminum silicate), wood flour, chalk, coconut shell flour, glass powder, bentonite, various clays, talc (magnesium metasilicate), calcium silicate, aluminum oleate, corn starch, kaolin, pectin, shellac and glucose may be used. Preferably, the thickener is a seed flour or finely divided silica.

The seed flour used in the compositions of this invention can be any finely ground flour prepared from plant seeds such as wheat, oats, rice, barley and their mixtures, and containing granulated starch cells, gluten, cellulose, enzymes and the like. Mixtures of silica and a seed flour can be used.

Boric acid, having the formula $H_3BO_3$, used in the compositions of this invention is a weak acid, sparingly soluble in water and exhibits a wetting action on the thickeners. About one gram dissolves in 18 ml. of cold water and 4 ml. of boiling water. The presence of nitric acid aids in the solubility of the boric acid in the compositions of this invention. The boric acid is added in solid flakes form to the compositions and its solution is aided by agitation.

The wetting agent which may be present in the compositions of this invention in an amount sufficient to form a stable slurry can be of the type used in acid solution, that is, anionic or nonionic in character. Among the anionic wetting agents are alkyl aryl sulfonates, polyethanolamine alkyl sulfates, sulfated fatty esters and polyether sulfonates. Examples of nonionic wetting agents are higher alkyl phenoxy polyoxyethylene ethanols, fatty alkanolamides, alky-phenol polyglycolethers, alkyl-aryl ethers, alkyl-aryl polyethers and alkyl benzyl polyethylene glycol ethers. Specific examples of wetting agents that can be used are dodecyl benzene sulfonic acid and the alkali metal salts thereof, the alkali metal salts of alkyl naphthalene sulfonic acids, triethanolamine lauryl sulfate and the alkali metal salts of alkyl aryl polyether sulfonates. A preferred wetting agent is boric acid. The sodium salt of dodecyl benzene sulfonate is also illustrative. These wetting agents are used without phosphate builders, although the presence of a corrosion inhibitor is not precluded.

Although, commercially available nitric acid having a concentration of about 68% (a constant boiling mixture with water) is preferably used in the compositions of this invention, pure nitric acid can be used as well as more dilute solutions. Where more dilute nitric acid solutions are used, the proportion of water is necessarily reduced.

The colloidal silica thickener used in the compositions of this invention comprises substantially pure $SiO_2$ of extremely small particle size and enormous surface area. A preferred form of silica is the proprietary product known in the art by its tradename Cab-I-Sil or Cab-O-Sil M5. This product is a colloidal silica prepared in a hot gaseous envoronment by vapor-phase hydrolyses of a silicon compound. This product is preferred over silicas prepared by aqueous precipitation processes. Any such silica can be used as long as it is characterized by high chemical purity, low water content and enormous surface area. Such products are also characterized by their high degree of particle separation and function in relatively low concentrations as a reinforcing, gelling or thickening agent for the compositions.

Although it is contemplated that the compositions and method of this invention can be sued to successfully treat a wide variety of errous metals, the best results have been found in cleaning and treating stainless steels of the austentic chromium-nickel type or chrome type which because of their combined ease of forming, welding and resistance to corrosion are used in reaction vessels, pipes, storage tanks and tank cars in the chemical industry. Best results are obtained in cleaning stainless steels identified by AISI type Nos. 304L, 316, 321 and 410 containing prescribed composition limits of carbon, chromium, nickel and other elements such as manganese and titanium. AISI type 410 stainless steel is a martensitic steel containing 11.5 to 13.5% by wt. of chromium and is widely used where heat treatment is involved.

The compositions of this invention preferably contain nitric acid and a thickening agent of the group consisting of finely divided silica and a seed flour and boric acid. The boric acid can also be used with the finely divided silica and it is preferred that no more than about .5 part of boric acid be used with each 20 parts of silica present.

The natural sugar products containing chloride ions which are capable of corroding austentic chromium-nickel and certain martensitic type stainles steels are known articles of commerce. These products result from both the starch and sugar processing industries, e.g., commercial glucose, dextrose and other similar conversion products. Starch from a number of natural sources is mixed with water and heated in the presence of water and acid to convert it to a number of degradation products of which the final product is dextrose. The lower degrees of conversion products are corn syrup while the higher conversion products are commercial corn syrup, where the corn kernel is the starting material. Corn syrup usually ranges from 31 to 55 dextrose equivalent. Corn molasses, comprising an uncrystallizable dark-colored liquid resulting from the formation of pressed sugars is also a corrosive product under certain conditions. Other products known as mixing corn syrup, special tanner's corn syrup and brewers corn syrup which are used in the confectionary, ice cream, meat, baking and pharmaceutical industries are likewise included. Products known as corn sugar and hydrate corn sugar containing about 10 to 20% by weight of water fall into the class of natural sugar products which can cause a corrosion problem to which the compositions and method of this invention are applicable.

Cellulose is another product which causes corrosion of stainless steel. In paper mills the stainless steel troughs under the screens suffer "area" corrosion because small "nests" of wood fibers adhere to the stainless steel surface on occasional stainless spires. The stainless steel under the nets becomes active (anodic) because of oxygen starvation and corrodes by means of galvanic action with the surounding cathodic, still passivated, area adjacent to the "nests."

Other food products, particularly those containing small amounts of water e.g. 0.001 to 1.0 wt. percent, and at least about 250 p.p.m. of chloride ions have the same effect as the sugar syrups. In addition, stainless steel sheets, after pickling and passivation are often form rolled. The sheets in the tank cars treated in accordance with Examples I and II herein were rolled in this manner. The inside wall of each car had well outlined areas where the iron of the roll became imbedded in the surface of the stainless steel. The iron naturally rusted and the area became unsightly. The contamination was completely removed by the instant slurry and, at the same time, became passivated. A standard ferroxyl test was positive before treatment, negative afterwards in the examples reported herein.

The compositions and method of this invention can, accordingly, be applied to any stainless steel surface which has become corroded and has particular application where the corrosion is due to contact with organic products, particularly food products. The invention has particular utility in treating stainless steel surfaces which have had their passivity destroyed or reduced due to reaction with food products and cellulosic products under conditions of prolonged quiescent contact with the surface or have become dried thereon, in the substantial absence of oxygen. These corrosive or activated conditions are apparently more severe when the food products also contain anions such as chloride ions in concentrations of about 250 to about 500 p.p.m. By applying the method and compositions of this invention, these problems are eliminated.

The method of this invention is carried out by applying the compositions of this invention in the form of a gel, paste or concentrated solution to the corroded steel parts. This is done by washing, painting, brushing, spraying or blasting the composition upon the metal surface and allowing it to remain for at least about thirty minutes. During this time the coating of the composition is formed due to partial loss of water because of evaporation. The metal in this coated condition can be left for an indefinite period of time without harm as long as the coating is complete and continous. This treatment forms a coating which is extremely resistant to corrosion yet retains the brightness and smoothness of stainless steel. After the coating has dried, or while still moist, it is readily removed by washing with cold or hot water or by blasting the surface with steam.

Having thus described the invention what is claimed is:

1. The method of cleaning stainless steel surfaces corroded as a result of contact with organic material which comprises treating said steel with a composition consisting essentially of an aqueous solution of nitric acid and a thickening agent of the group consisting of silica, seed flour, wood flour, coconut shell flour, corn starch, kaolin, aluminum oleate and talc and mixtures thereof, said nitric acid being present in an amount ranging from about 3% to about 15% by weight and said thickening agent being present in an amount of about 1% to about 40% by weight, allowing said composition to remain in contact with the steel for a time sufficient to form a coating thereon and removing said coating.

2. The method in accordance with claim 1 in which said solution contains about 5 to 40 parts of thickener, about 3 to 10 parts of nitric acid and about 92 to 500 parts of water.

3. The method in accordance with claim 2 in which said solution contains about 0.5 to about 5 parts of a wetting agent of the group consisting of boric acid and an alkali metal salt of a dodecyl aryl sulfonic acid.

4. The method in accordance with claim 3 in which said wetting agent is boric acid.

5. The method in accordance with claim 1 in which said stainless steel has been subjected to contact with a natural sugar syrup containing active amounts of chloride ion.

6. The method in accordance with claim 1 which said stainless steel has been subjected to contact with cellulose under conditions to produce galvanic corrosion thereof.

7. The method in accordance with claim 1 in which the thickening agent is colloidal silica.

8. The method in accordance with claim 3 in which the thickening agent is a seed flour and said wetting agent is boric acid.

9. The method in accordance with claim 1 in which the stainless steel is of the austentic type and said organic material is a natural sugar syrup.

10. The method in accordance with claim 1 in which said coating is removed by steam and the clean metal surface is passivated.

References Cited

UNITED STATES PATENTS

| | | | |
|---|---|---|---|
| 1,049,466 | 1/1913 | Ellis | 252—142 |
| 2,209,591 | 7/1940 | Barnes | 252—8.55 |
| 2,257,467 | 9/1941 | Jacobson | 252—145 |
| 2,735,818 | 2/1956 | Cardwell et al. | 252—145 |
| 2,913,418 | 11/1959 | Sohngen et al. | 252—163 |
| 2,937,149 | 5/1960 | Hilton | 252—136 |
| 3,275,560 | 9/1966 | Wasserman et al. | 252—136 |

OTHER REFERENCES

Rose: The Condensed Chem. Dict. (6th ed.) (1961), Reinhold Publ. Co., pp. 164 and 1040.

LEON D. ROSDOL, Primary Examiner

W. E. SCHULZ, Assistant Examiner

U.S. Cl. X.R.

134—4, 22, 41, 42; 252—142, 145, 317